(12) United States Patent  
Caamano

(10) Patent No.: US 7,358,639 B2
(45) Date of Patent: *Apr. 15, 2008

(54) HIGH FREQUENCY ELECTRIC MOTOR OR GENERATOR

(76) Inventor: Ramon A. Caamano, 6450A Mt. Madonna Rd., Gilroy, CA (US) 95020

( * ) Notice: Subject to any disclaimer, the term of this patent is extended or adjusted under 35 U.S.C. 154(b) by 180 days.

This patent is subject to a terminal disclaimer.

(21) Appl. No.: 11/228,747

(22) Filed: Sep. 16, 2005

(65) Prior Publication Data

US 2007/0222325 A1    Sep. 27, 2007

Related U.S. Application Data

(60) Continuation-in-part of application No. 10/956,900, filed on Sep. 30, 2004, now Pat. No. 7,030,534, which is a division of application No. 10/060,645, filed on Jan. 30, 2002, now Pat. No. 6,879,080.

(51) Int. Cl.
 *H02K 1/00*   (2006.01)
(52) U.S. Cl. ............... 310/216; 310/45; 310/254
(58) Field of Classification Search .......... 310/42, 310/45, 67 R, 68 R, 208, 254, 259, 216
See application file for complete search history.

(56) References Cited

U.S. PATENT DOCUMENTS 3,760,493 A    9/1973  Snively
3,803,431 A    4/1974  Inaba et al.
3,827,141 A    8/1974  Hallerback
4,254,349 A    3/1981  Bocharov et al.
4,255,684 A    3/1981  Mischler et al.
4,940,913 A    7/1990  Fritzsche
5,982,070 A   11/1999  Caamano
6,188,159 B1   2/2001  Fan
6,218,760 B1   4/2001  Sakuragi et al.
6,236,135 B1   5/2001  Suzuki et al.
6,259,233 B1   7/2001  Caamano
6,362,553 B1   3/2002  Nakahara et al.
6,603,237 B1   8/2003  Caamano
7,030,534 B2 * 4/2006  Caamano .................. 310/254

FOREIGN PATENT DOCUMENTS

EP    0630096 A1   12/1994
EP    0905867 A2    3/1999
JP      11308832    11/1999
WO   WO 01/86786 A  11/2001

* cited by examiner

*Primary Examiner*—Thanh Lam

(57) ABSTRACT

A device such as an electric motor, an electric generator, and a regenerative electric motor includes at least one independent energizable electromagnetic assembly. Each independent electromagnetic assembly has an associated one-piece magnetic core. Each independent electromagnetic assembly defines two stator poles. Each one-piece magnetic core provides the entire magnetic return path for the two magnetic stator poles associated with each independent electromagnetic assembly.

17 Claims, 7 Drawing Sheets

HIGH FREQUENCY ELECTRIC MOTOR OR GENERATOR

This application is a continuation-in-part of copending prior application Ser. No. 10/956,900, filed on Sep. 30, 2004, now U.S. Pat. No. 7,030,534; which is a divisional application of application Ser. No. 10/060,645, filed on Jan. 30, 2002, and issued as U.S. Pat. No. 6,879,080 on Apr. 12, 2005; the disclosures of which are incorporated herein by reference.

BACKGROUND OF THE INVENTION

The present invention relates generally to electric motors, generators, and regenerative motors. The term regenerative motor is used herein to refer to a device that may be operated as either an electric motor or a generator. More specifically, the invention relates to an electric motor, generator, or regenerative motor including a stator arrangement which itself includes a plurality of individual electromagnetic assemblies with each independent electromagnetic assembly including an associated one-piece magnetic core formed from thin film soft magnetic material.

The electric motor and generator industry is continuously searching for ways to provide motors and generators with increased efficiency and power density. For some time now, it has been believed that motors and generators constructed using permanent super magnet rotors (for example cobalt rare earth magnets and Neodymium-Iron-Boron magnets) and stators including electromagnets with magnetic cores formed from thin film soft magnetic material have the potential to provide substantially higher efficiencies and power densities compared to conventional motors and generators. Also, because cores formed from thin film soft magnetic material are able to respond to changes in a magnetic field much more quickly than conventional ferrous core materials, magnetic cores formed from thin film soft magnetic material have the potential to allow much faster field switching within motors and generators, and therefore allow much higher speed and better controlled motors and generators than conventional ferrous cores. However, to date it has proved very difficult to provide an easily manufacturable motor or generator that includes magnetic cores formed from thin film soft magnetic materials. Furthermore, the configurations that have been disclosed to date do not take full advantage of the capabilities of these potentially more efficient materials for certain types of applications.

Thin film soft magnetic materials such as amorphous metal are typically supplied in a thin continuous ribbon having a uniform ribbon width. In the past, amorphous metal cores have been formed by rolling an amorphous metal ribbon into a coil, annealing the winding, and then saturating and encapsulating the winding using an adhesive such as an epoxy. However, this material is a very hard material making it very difficult to cut or form easily, especially once it has been laminated into a bulk piece. Also, once annealed to achieve peak magnetic properties, these materials become very brittle. This makes it difficult and expensive to use the conventional approach to constructing a magnetic core.

Another problem with amorphous metal magnetic cores is that the magnetic permeability of amorphous metal material is reduced when it is subjected to physical stresses. This reduced permeability may be considerable depending upon the intensity of the stresses on the amorphous metal material. As an amorphous metal magnetic core is subjected to stresses, the efficiency at which the core directs or focuses magnetic flux is reduced resulting in higher magnetic losses, reduced efficiency, increased heat production, and reduced power. This phenomenon is referred to as magnetostriction and may be caused by stresses resulting from magnetic forces during the operation of the motor or generator, mechanical stresses resulting from mechanical clamping or otherwise fixing the magnetic core in place, or internal stresses caused by the thermal expansion and/or expansion due to magnetic saturation of the amorphous metal material.

In U.S. Pat. Nos. 5,982,070 and 6,259,233 that issued to the applicant and that are both incorporated herein by reference, certain methods and arrangements for constructing electric motors and generators were described. In these patents, hereinafter referred to as the '070 patent and '233 patent respectively, multiple amorphous metal core pieces are supported in a dielectric housing to form an overall amorphous metal core. Another U.S. Pat. No. 4,255,684 issued to Mischler et al. describes another motor configuration that utilizes amorphous metal materials. Although these approaches allow motors and generators to be constructed using amorphous metal cores, there are some inherent problems associated with these approaches. For example, the use of multiple core pieces to form the overall core means that there are parasitic gaps between adjacent core pieces that the magnetic flux has to cross as the flux flows through the magnetic core. These parasitic gaps occur at any point that the flux must pass from one piece or layer of core material to another. Although these gaps may be made very small by manufacturing the various core pieces to very tight tolerances, and may be filled with epoxy, they still result in parasitic losses that reduce the efficiency at which the flux can flow through the core compared to a core that does not have these gaps.

In addition to the parasitic gap problem, the methods and arrangements of the '070 and '233 patents make it difficult to always orient the amorphous metal magnetic material in the proper orientation. This is especially true of the radial gap devices disclosed in these patents. The proper orientation of the thin film soft magnetic material is important to maximizing the efficiency at which the magnetic flux is able to flow through the core material, and therefore, the efficiency of the device.

In the case of the axial gap configurations disclosed in the '070 and '233 patents, the physical configuration of the axial gap device makes it difficult to maintain the proper air gap between the rotor and the stator. Because the magnetic forces act axially along the rotational axis of the device, expensive bearings having very tight tolerances must be used to support and hold the rotor in place. Also, the housing materials supporting the stator must be able to withstand these very high axial forces without deforming over the life of the device. Furthermore, since the stator and rotor supporting members are members that are substantially disk shaped and are generally planar, they are more susceptible to warping or deformation due to the large axial magnetic forces and due to internal stresses caused by temperature changes that occur regularly during normal operation of the device. As larger and larger axial gap devices are contemplated, the magnetic forces between the rotor and stator become larger and larger further compounding this problem.

The present invention provides improved methods and arrangements for providing electric motors, generators, and regenerative motors that use magnetic cores formed from thin film soft magnetic core materials. The present invention also provides for improved electric motor, generator, and regenerative motor configurations that more fully utilize the potential benefits associated with using magnetic cores formed from thin film soft magnetic materials.

SUMMARY OF THE INVENTION

As will be described in more detail hereinafter, magnetic cores for use as part of a stator arrangement in a device such as an electric motor, an electric generator, or a regenerative electric motor are disclosed herein. Stator arrangements and methods of making stator arrangements utilizing the magnetic cores, and devices and methods of making devices utilizing the stator arrangements, are also disclosed. The devices include a stator arrangement having at least one independent energizable electromagnetic assembly with each independent electromagnetic assembly having an associated one-piece magnetic core formed from thin film soft magnetic material. Each independent electromagnetic assembly defines two stator poles located at opposite ends of the one-piece magnetic core. Each one-piece magnetic core provides the entire magnetic return path for the two opposite magnetic stator poles associated with each independent electromagnetic assembly.

In one embodiment, the device is a rotating device including a rotor arrangement supported for rotation relative to the stator arrangement about a given rotational axis at a certain range of normal operating rotational speeds. The rotor arrangement includes a plurality of rotor poles for magnetically interacting with the stator poles. The rotor poles are supported for rotation about the rotational axis relative to the stator arrangement along a circular path. In this embodiment, the device is a radial gap device, and the electromagnetic assemblies of the stator arrangement include U-shaped one-piece magnetic cores formed such that the stator poles of each electromagnetic assembly are located at the ends of the legs of the U-shaped magnetic cores. The electromagnetic assemblies are positioned around the circular path of the rotor poles with each electromagnetic assembly being positioned such that the two stator poles of each electromagnetic assembly are located adjacent to one another facing the circular path of the rotor poles and in line with one another along the direction of the circular path of the rotor poles.

In another embodiment, the device is a rotating device and the device includes a rotor arrangement supported for rotation relative to the stator arrangement about a given rotational axis at a certain range of normal operating rotational speeds. The rotor arrangement includes a plurality of rotor poles for magnetically interacting with the stator poles with the rotor poles being supported for rotation about the rotational axis relative to the stator arrangement along a circular path. In this embodiment, the electromagnetic assemblies of the stator arrangement are positioned around only a portion of the circular path of the rotor poles.

The device may be a rotational device, a linear device, a reciprocating device, a switched reluctance device, an induction device, a permanent magnet device, or a multiple phase device. The device may be configured such that each of the independent electromagnetic assemblies is independently removable and replaceable. Additionally, the thin film soft magnetic material used to form the magnetic cores may be a nano-crystalline material.

In another embodiment, the device includes a plurality of associated magnetic poles configured to magnetically interact with the stator poles of the electromagnetic assemblies. The device also includes a switching arrangement for controlling the electromagnetic assemblies such that the switching arrangement is able to cause the stator poles of the electromagnetic assemblies to magnetically interact with the associated magnetic poles at a frequency of at least 500 cycles per second while the device is operated within at least a portion of the normal operating speed range of the device. The device may be a rotational device including a rotor arrangement supported for rotation relative to the stator arrangement about a given rotational axis at a certain range of normal operating rotational speeds. In this case, the rotor arrangement includes a plurality of rotor poles for magnetically interacting with the stator poles and the rotor poles are supported for rotation about the rotational axis relative to the stator arrangement along a circular path. With this configuration, the switching arrangement causes the stator poles of the electromagnetic assemblies to magnetically interact with the rotor poles of the rotor arrangement such that the ratio of the frequency of the device in cycles per second relative to the revolutions per minute of the device is greater than 1 to 4 during the operation of the device.

In another embodiment, the device includes a stator arrangement having a plurality of independent energizable electromagnetic assemblies with each independent electromagnetic assembly having an associated one-piece magnetic core. Each independent electromagnetic assembly defines two stator poles and each one-piece magnetic core provides the entire magnetic return path for the two magnetic stator poles associated with each independent electromagnetic assembly. A rotor arrangement is supported for rotation relative to the stator arrangement about a given rotational axis at a certain range of normal operating rotational speeds. The rotor arrangement includes a plurality of rotor poles for magnetically interacting with the stator poles and the rotor poles are supported for rotation about the rotational axis relative to the stator arrangement along a circular path. In this embodiment, the electromagnetic assemblies of the stator arrangement are positioned around only a portion of the circular path of the rotor poles. Additionally, the one-piece magnetic cores may be formed from thin film soft magnetic material.

BRIEF DESCRIPTION OF THE DRAWINGS

The features of the present invention may best be understood by reference to the following description of the presently preferred embodiments together with the accompanying drawings in which.

DETAILED DESCRIPTION OF THE PREFERRED EMBODIMENTS

Figure 1:
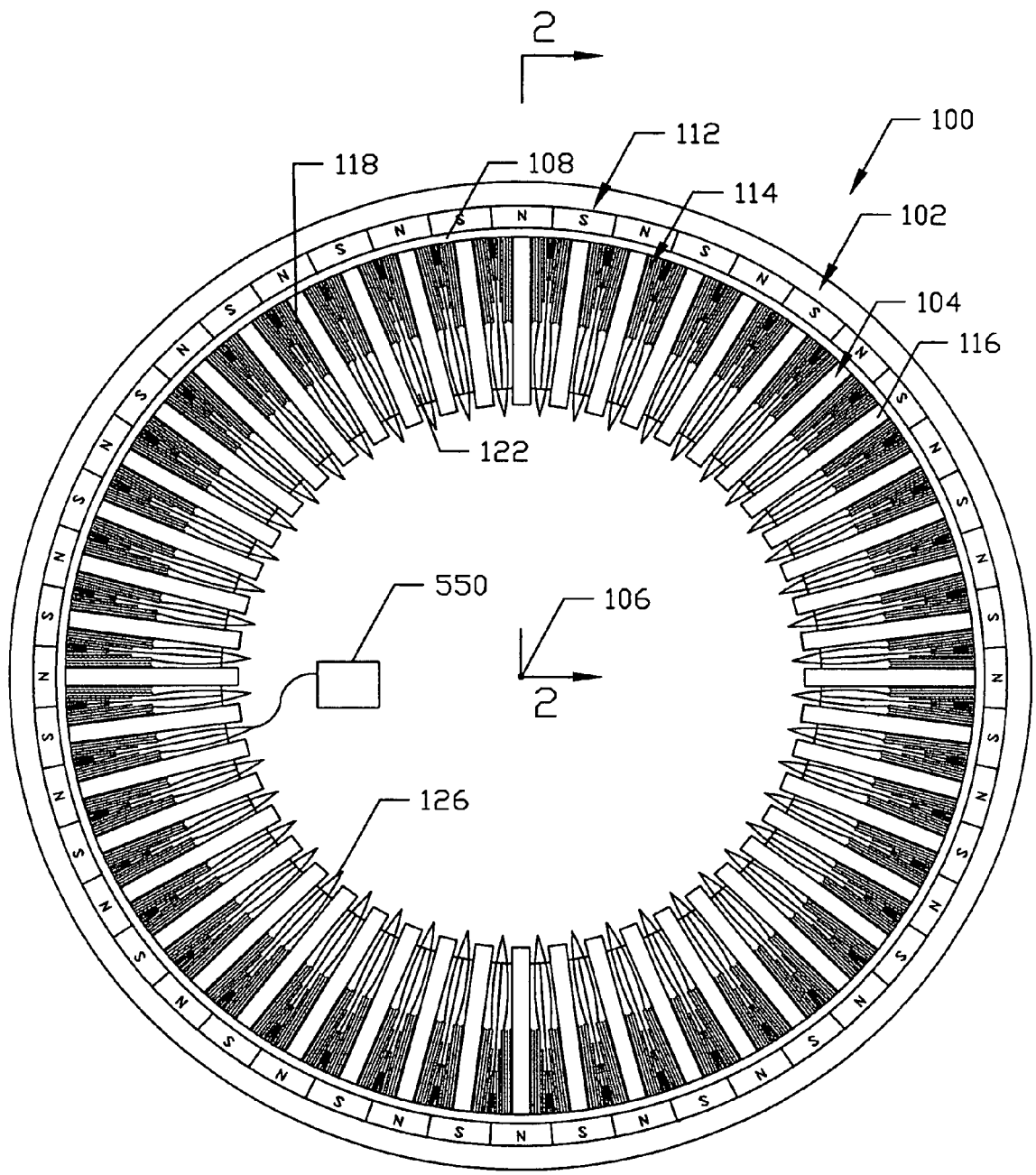
FIG. 1 is a diagrammatic cross-sectional plan view of a device designed in accordance with the present invention including a rotor arrangement and a stator arrangement having a plurality of electromagnetic assemblies.
Figure 2:
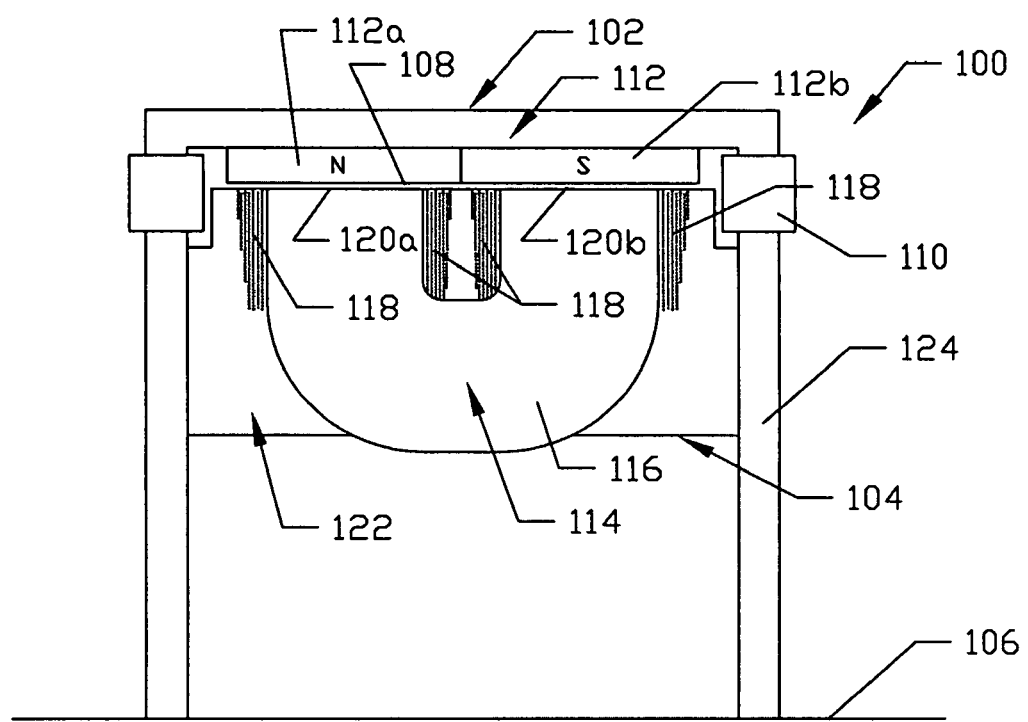
FIG. 2 is a cross-sectional view of the device of FIG. 1 taken through section line 2-2 of FIG. 1.

Turning to the drawings, wherein like components are designated by like reference numerals throughout the various figures, attention is initially directed to FIGS. 1 and 2. FIG. 1 illustrates a cross sectional plan view of a device 100 designed in accordance with the present invention. Although device 100 will be referred to as an electric motor an electric generator at various times throughout this description, it should be understood that device 100 may take the form of a motor, a generator, an alternator, or a regenerative motor depending on the requirements of the application in which the device is used. For purposes of this description, the term regenerative motor refers to a device that may be operated as either an electric motor or an electric generator.

Also, although device 100 will in most cases be described as a DC brushless motor, it should be understood that it may take the form of a wide variety of other types of motors and/or generators and still remain within the scope of the invention. These other types of motors and/or alternators/generators include, but are not limited to, DC synchronous devices, variable reluctance or switched reluctance devices, and induction type motors. The specific differences between these different types of devices are well known to those skilled in the art and therefore will not be described in detail. For example, although device 100 will in most cases be described as a DC brushless motor that uses permanent magnets as rotor poles, it should be understood that the rotor poles would not be permanent magnets in the case of a switched reluctance device or an induction device. Instead, the rotor poles of these types of devices would most likely be provided by protrusions of other magnetic materials formed from laminations of materials such as iron or preferably thin film soft magnetic materials such as those that will be described hereinafter with reference to the stator core materials of the present invention.

As best shown in FIG. 1, device 100 includes a rotor arrangement 102 and a stator arrangement 104. In this embodiment, device 100 takes the form of a hub motor/generator with rotor arrangement 102 being located around the perimeter of device 100. Stator arrangement 104 is located inside of rotor arrangement 102. As best shown in FIG. 2, which is a cross sectional view of a portion of device 100 as indicated by section 2-2 of FIG. 1, rotor arrangement 102 is supported by bearings 110 so that rotor arrangement 102 may rotate around stator arrangement 104. An air gap 108 separates rotor arrangement 102 from stator arrangement 104.

Although device 100 is illustrated using bearings 110 for supporting rotor arrangement 102 for rotation about stator arrangement 104 and axis 106, this is not a requirement. Instead, it should be understood that any other suitable and readily providable arrangement for supporting rotor arrangement 102 may be utilized and still remain within the scope of the invention. Also, although device 100 has been described as a hub motor/generator, this is not a requirement of the invention. Instead, as will be described in more detail hereinafter, the device may be any type of electric motor, generator, or regenerative motor so long as the device includes a stator arrangement that has at least one electromagnet having magnetic cores formed from a thin film soft magnetic material with the electromagnets being configured in accordance with the invention.

Referring to both FIGS. 1 and 2, rotor arrangement 102 will now be described in more detail. In this embodiment, device 100 is a radial gap type device and rotor arrangement 102 includes 48 pairs of radially adjacent permanent magnet segments 112. Magnet segments 112 may be super magnets such as cobalt rare earth magnets or any other suitable or readily providable magnet material. Each of the 48 magnet segment pairs 112 includes a first magnet segment oriented to form a north rotor pole 112a and a second magnet segment oriented to form a south rotor pole 112b. As illustrated in FIG. 2, north rotor pole 112a is located adjacent to south rotor pole 112b such that the two permanent magnet segments are in line with one another along a line that is parallel with the rotational axis of the device. With this orientation, the two permanent magnet segments 112a and 112b of each magnet segment pair 112 define two adjacent circular paths around rotational axis 106 of device 100 when the rotor arrangement is rotated about the rotational axis of the device. As shown best in FIG. 1, the 48 magnet pairs are positioned around the inside periphery of rotor arrangement 102 facing air gap 108 with each consecutive pair being reversed such that all of the adjacent magnet segments alternate from north to south around the entire rotor arrangement in both of the circular paths defined by the pairs of magnet segments 112.

Although magnets 112 have been described as being permanent super magnets, this is not a requirement. Alternatively, the magnets may be other magnetic materials, or, in some cases may be electromagnets. Also, although the rotor has been described as including 48 magnet pairs, it should be understood that the rotor may include any number of magnet pairs and still remain within the scope of the invention. And finally, although the rotor arrangement has been described as including magnets, this is not a requirement. For example, in the case of a switched reluctance motor or an induction motor, rotor arrangement 102 would not include magnets at all. Instead, as would be understood by those skilled in the art, rotor arrangement 102 would be constructed from an iron based material or some other magnetic material such as thin film soft magnetic material to form a magnetic rotor core which would be driven by a rotating magnetic field created by the switching of the stator arrangement.

In this embodiment, stator arrangement 104 includes 48 independent electromagnetic assemblies 114. Each electromagnetic assembly 114 includes an associated one-piece magnetic core 116 formed from a nano-crystalline, thin film soft magnetic material and a pair of coils 118. As shown best in FIG. 2, each one-piece magnetic core 116 is U-shaped with coils 118 being positioned around the legs of U-shaped magnetic core 116. With this configuration, each independent electromagnetic assembly defines two stator poles 120a and 120*b* located at opposite ends of the one-piece magnetic core. The electromagnetic assemblies 114 are positioned around the circular path of the rotor poles as shown in FIG. 1. As shown best in FIG. 2, each electromagnetic assembly 114 is positioned such that the two stator poles 120*a* and 120*b* of each electromagnetic assembly are located adjacent to one another and in line with one another along a line that is parallel with the rotational axis of the device. This places the two stator poles of each electromagnetic assembly facing air gap 108 and in a confronting relationship with magnet segment pairs 112*a* and 112*b*.

Although magnetic cores 116 have been described as being formed from a nano-crystalline, thin film soft magnetic material, this is not a requirement of the invention. Instead, any thin film soft magnetic material may be used. These materials include, but are not limited to, materials generally referred to as amorphous metals, materials similar in elemental alloy composition to nano-crystalline materials that have been processed in some manner to further reduce the size of the crystalline structure of the material, and any other thin film materials having similar molecular structures to amorphous metal and nano-crystalline materials regardless of the specific processes that have been used to control the size and orientation of the molecular structure of the material.

Also, although electromagnetic assemblies 114 have been described as including a pair of coils located on the legs of the U-shaped magnetic core 116, this is not a requirement of the invention. Instead, the coils may be a single coil located at the base of the U-shaped magnetic core, a single coil running along the entire length of the core, or any other desired configuration using one or more coils. As illustrated in FIG. 1, the coils may be tapered coils with more windings at one end of each leg of the U-shaped core. This configuration allows the larger number of windings at one end to more fully fill the larger spaces left between the magnetic cores in the regions that are further away from the rotational axis. Furthermore, these coils may be wrapped directly onto the core pieces, or alternatively, the coils may be formed separately from the core pieces, wrapped with insulation or otherwise insulated, and then slipped over the core during the assembly of the electromagnetic assembly.

In accordance with one aspect of the invention, each one-piece magnetic core 116 provides the entire magnetic return path for the two opposite magnetic stator poles 120*a* and 120*b* associated with each independent electromagnetic assembly 114. This configuration eliminates the need for a traditional style back iron of magnetic core material that magnetically interconnects all of the stator poles. By eliminating the requirement for a back iron that is common to all of the stator poles, the weight of the device may be reduced compared to the weight of a similarly sized device that utilizes a more conventional configuration that includes a common back iron for magnetically interconnecting the stator poles.

Electromagnetic assemblies 114 may be mechanically held in position using any conventional manner for holding elements in place. For example, electromagnetic assemblies 114 may all be potted or encapsulated into one complete overall stator using an encapsulating material such as a thermally conductive, dielectric epoxy. However, each electromagnetic assembly may be individually encapsulated into a wedge shaped piece such as wedge shaped piece 122 shown in FIG. 1. These wedge shaped pieces may then be assembled into an overall stator using a disk shaped structural element such as elements 124 in FIG. 2 located on each side of the electromagnetic assemblies to support pieces 122. Alternatively, any other suitable and readily providable arrangement for supporting wedge shaped pieces may be used and still fall within the scope of the invention.

Because each of the electromagnetic assemblies 114 may be provided as an independent assembly including its own one-piece magnetic core that provides the entire return path for the associated stator poles of the electromagnetic assembly, these assemblies may be configured such that they are easily removable and replaceable. For example, as described above, each electromagnetic assembly may be independently encapsulated and then assembled into an overall stator. This allows any given electromagnetic assembly to be relatively easily removed and replaced. This ability to relatively easily replace the individual electromagnetic assemblies improves the serviceability of the device. Also, this modular approach allows a particular electromagnetic assembly configuration to be used in a variety of specific device designs thereby potentially improving the economies of scale that may be obtained using this approach.

Although the electromagnetic assemblies have been described as being encapsulated, this is not a requirement of the invention. Instead, the electromagnetic assemblies may be assembled and then simply clamped into position without being encapsulated. Therefore, it should be understood that any known method may be used to support the electromagnetic assemblies in their respective locations.

As described above, device 100 includes 48 electromagnetic assemblies defining 48 pairs of stator poles. Device 100 also includes 48 pairs of magnet segments that define a corresponding 48 pairs of rotor poles. In this embodiment, stator arrangement 104 is wired as a single-phase device. That is, every electromagnetic assembly is wired together in series, as indicated in FIG. 1 by wires 126. Also, this device has a stator pole to rotor pole ratio of 1 to 1. Although this embodiment is described as a single-phase device having a 1 to 1 stator pole to rotor pole ratio, this is not a requirement. Instead, the device may be a multi-phase device or a device having any desired stator pole to rotor pole ratio.

Figure 4:
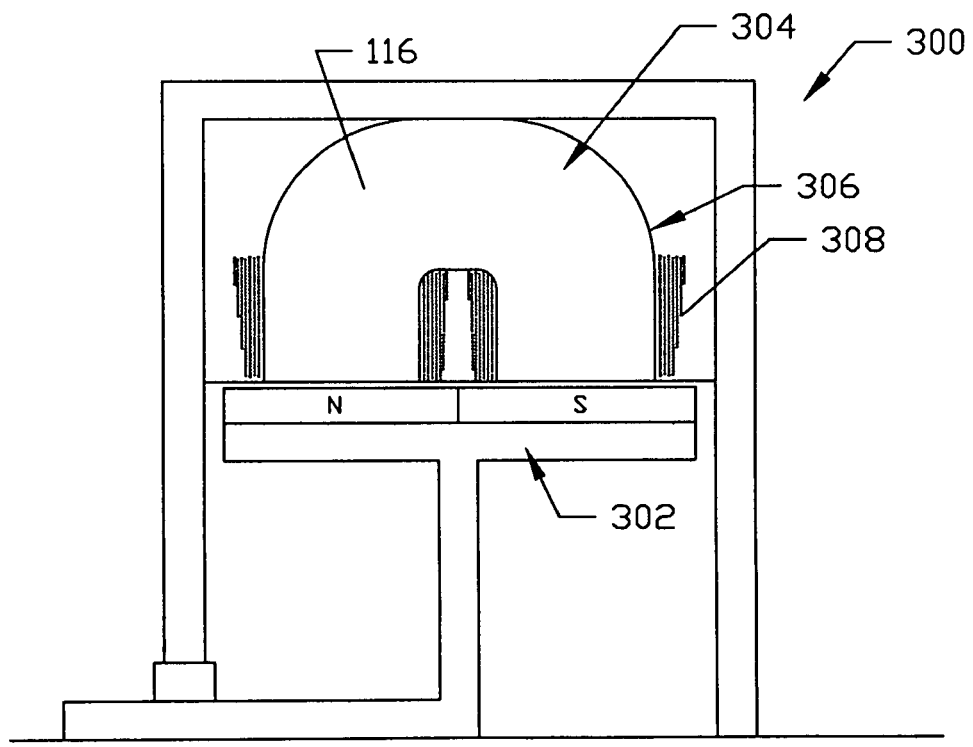
FIG. 4 is a cross-sectional view of the device of FIG. 3 taken through section line 4-4 of FIG. 3.
Figure 3:
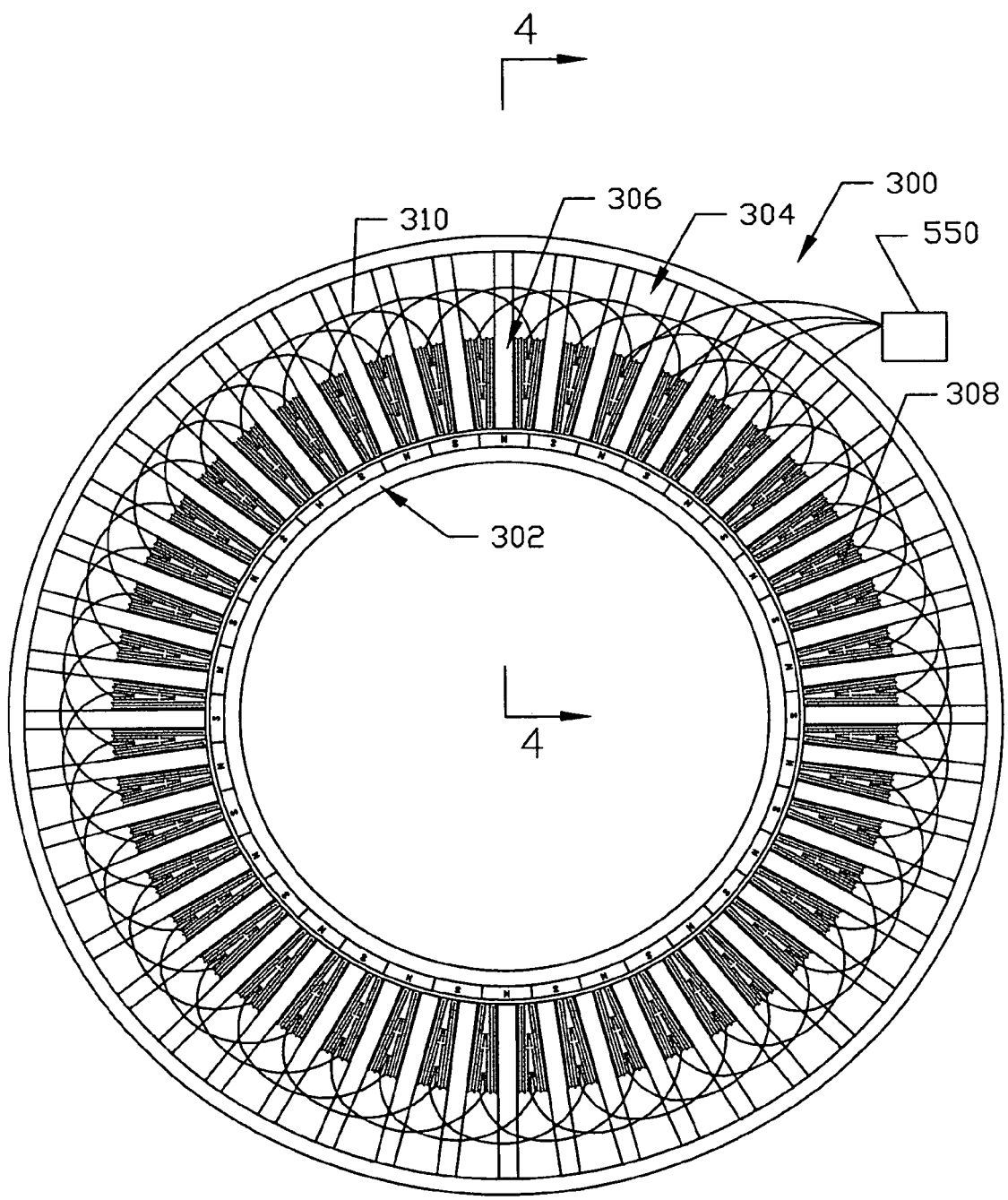
FIG. 3 is a diagrammatic cross-sectional plan view of another embodiment of a device designed in accordance with the present invention including a rotor arrangement and a stator arrangement having a plurality of electromagnetic assemblies.
Figure 5:
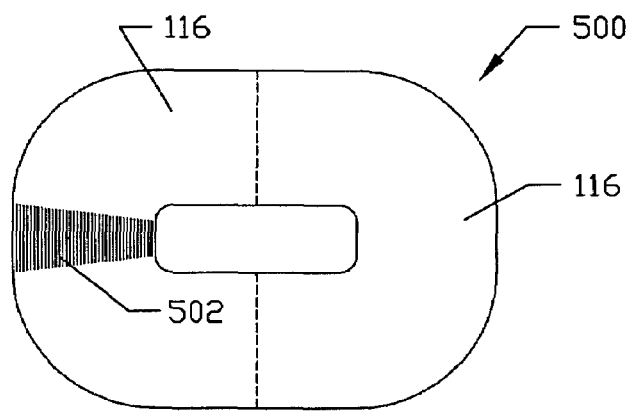
FIG. 5 is a diagrammatic side view of a thin film soft magnetic material winding used to form one-piece magnetic cores in accordance with the invention.

Although device 100 has been described with the rotor arrangement around the outer perimeter of the device and the stator arrangement located inside of the rotor arrangement, this is not a requirement. Instead, the stator arrangement may be located around the outer perimeter of the device with the rotor arrangement inside of the stator arrangement as illustrated in FIGS. 3 and 4. These figures illustrate a device 300 having a rotor arrangement 302 and a stator arrangement 304. Stator arrangement 304 includes 48 electromagnetic assemblies 306 that use magnetic cores 116 that are identical to those used in device 100 except that they are oriented in the opposite direction as shown best in FIG. 4. Each electromagnetic assembly 306 also includes coils 308. Coils 308 are similar to coils 118 of device 100 except that they are tapered in the opposite direction so that there are more windings at the base of each of the legs of U-shaped magnetic core 116. This allows the windings to more fully fill the larger spaces available at the bases of the U-shaped legs compared to the ends of the U-shaped cores due to their inwardly facing orientation. For illustrative purposes, device 300 is set up as a 4-phase device having a stator pole to rotor pole ratio of 4 to 3. As shown in FIG. 3, wires 310 connect every fourth electromagnetic assembly in series to create 4 groupings of 12 electromagnetic assemblies making the device a 4-phase device. Also, rotor arrangement 302 includes only 36 pairs of rotor magnet segments rather than the 48 pairs described for device 100. As is well known in the art, this type of configuration reduces the detent effect that is prevalent in single-phase devices and it delivers a torque more consistently throughout the rotation of the device compared to a single phase device Referring now to FIG. 5, the specific configuration of magnetic core 116 for the particular embodiments shown in FIGS. 1-4 will be described in more detail. In these embodiments, each individual one-piece magnetic core 116 is formed by winding a continuous ribbon of thin film soft magnetic material into a desired shape. In the case of core 116, the shape is a generally oval shape as indicated by winding 500 in FIG. 5. Since thin film soft magnetic materials such as amorphous metal or nano-crystalline materials are typically provided in very thin tape form (for example, less than 1 mil thick), winding 500 may be made up of hundreds of winds of material as illustrated by lines 502. Once wound into the desired shape, winding 500 may be annealed to produce the desired magnetic characteristics and then saturated and encapsulated with a thin layer of adhesive material. Once annealed, these materials are very hard and typically very brittle making them somewhat difficult to machine. In the embodiment shown in FIG. 5, winding 500 is then cut into two U-shaped pieces that each provide one of the one-piece magnetic cores 116 described above.

As described above, one advantage to this configuration is that, when assembled into an electromagnetic assembly as described above, each one-piece magnetic core provides the entire return path for the two stator poles formed by the legs of the U-shaped magnetic core. This eliminates the need for a back iron to magnetically interconnect each of the stator poles. Another advantage to this configuration is that there are no parasitic gaps within the one-piece magnetic cores. Also, this configuration orients the layers of thin film soft magnetic material in the proper orientation for directing the flux through the magnetic core.

Although the core pieces have been described as being wound from a continuous ribbon of thin film soft magnetic material, this is not a requirement. Alternatively, the magnetic cores may be formed by stacking individually formed strips of material to form a magnetic core of any desired shape. Furthermore, the individual strips may be stacked atop one another with each piece being the same size and shape, or, alternatively, the individual strips may be stacked beside one another with various individual pieces having different sizes and shapes. These various approaches allow a wide variety of specific shapes to be formed.

As is known to those skilled in the art, when thin filmed soft magnetic material is annealed, it can have a particular direction along which magnetic flux will be directed most efficiently. For a ribbon of thin film soft magnetic material, this direction is typically either along the length of the ribbon or across the width of the ribbon. By using the appropriate approach described above to form each of the magnetic cores, the magnetic cores may be formed such that the material is always oriented such that the magnetic flux is directed through the pieces along the direction of the material that most efficiently directs the magnetic flux.

Devices 100 and 300 also include a switching arrangement 550, shown in FIGS. 1 and 3, for activating and deactivating coils 118 and coils 308 respectively with alternating polarity. Switching arrangement 550 may be any suitable and readily providable controller that is capable of dynamically activating and deactivating electromagnetic assemblies 114 and 306. Preferably, switching arrangement 550 is a programmable controller capable of activating and deactivating the electromagnetic assemblies at a rate of speed much higher than is typically done in conventional electric motors and generators. This is because of the inherent speed at which the magnetic field may be switched in a thin film soft magnetic core.

In accordance with another aspect of the invention, devices 100 and 300 include a very high pole count stator and rotor arrangement. As will now be described in more detail, this high pole count configuration provides several substantial and unexpected benefits compared to prior art motors/generators that use magnetic cores formed from thin film soft magnetic materials. As indicated in the prior art patents cited in the background of the invention, prior art devices utilizing magnetic cores formed from amorphous metal films have been described. However, these motors have been described as low pole count motors that use the high frequency capabilities of the amorphous metal material to provide very high rotational speed motors. The present invention takes advantage of the high frequency capabilities in a novel way. Instead of using the high frequency to produce high rotational speed, the present invention combines the high frequency capabilities of a magnetic core formed from thin film soft magnetic material with extraordinarily high pole counts. This combination provides devices capable of very high power densities while maintaining very manageable rotational speeds.

Although prior art devices may be capable of achieving relatively comparable overall power densities compared to those described herein, they obtain the high power output by providing a very high rotational speed device. This means that for many applications in which the high rotational speed is not desired, reduction gears must be used causing the overall system that uses the reduction gear to lose efficiency. In many situations, a device designed in accordance with this aspect of the invention, eliminates the need for reduction gears altogether thereby improving the overall efficiency of the system using the device. Furthermore, since the devices of the invention are able to deliver the high power densities while operating at much lower rotational speeds than previously contemplated, these devices are not subjected to the extreme centrifugal forces generated by much higher rotational speed devices. This makes devices in accordance with the invention much more reliable and economical to manufacture compared to high rotational speed devices.

Figure 6:
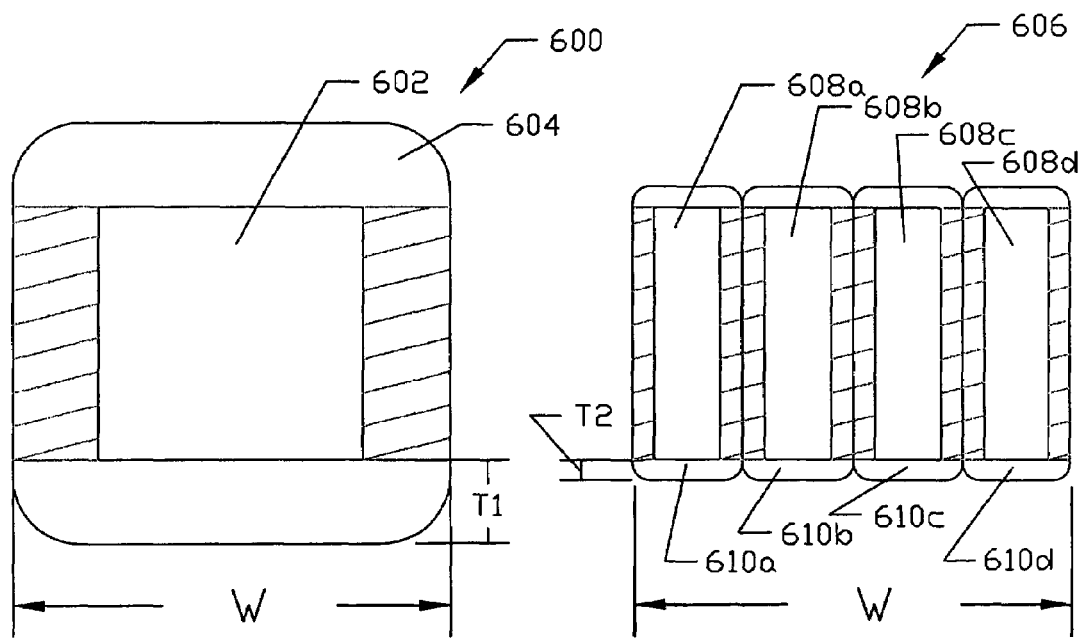
FIG. 6 is a diagrammatic plan view of two configurations of stator poles.

In addition to the advantage of providing very high power density at relatively low rotational speeds, devices designed in accordance with the present invention provide another unanticipated benefit. Assuming that the linkage area is held constant, that is, assuming that the actual physical area that exists between the stator poles and the rotor poles is held constant, increasing the pole count actually reduces the amount of material needed to provide the overall electromagnetic assemblies. This is illustrated in FIG. 6, which is a diagram illustrating plan views of two different stator pole configurations. On the left, a square shaped stator pole arrangement 600 includes a stator pole 602 and a winding 604 surrounding the stator pole perimeter. On the right of FIG. 6, the stator pole arrangement 606 includes 4 narrower rectangular shaped poles 608a-d and associated windings 610a-d surrounding each stator poles perimeter. In this example, the area of stator pole 602 is equal to the total area of stator poles 608a-d. However, each of windings 610a-d of arrangement 606 only need to have one quarter of the windings compared to windings 604 in order to provide the same overall flux linkage as stator pole arrangement 600 since each winding 61Oa-d only needs to generate one quarter of the flux linkage.

As illustrated in FIG. 6, the overall width W of both arrangement 600 and 606 is the same. Also, the area, and therefore the volume, of the windings along the sides of the stator poles of both arrangements is the same as indicated by the cross hatched portions of the windings of the two arrangements. However, as clearly shown in FIG. 6, the thickness T2, and therefore the area and volume, of the windings above and below the stator poles in arrangement 606 is reduced to one quarter the thickness T1 of arrangement 600. This significantly reduces the weight of the overall material cost associated with the device. Also, if the device is a device that includes a back iron for magnetically interconnecting the stator poles to provide a return path for the flux, the required thickness of the back iron is also reduced by a factor of four since the area of each stator pole is reduced by a factor of four. Since these high pole count devices provide the same torque as low pole count devices having the same linkage area, these reductions in the amount of material required has the potential to significantly reduce the weight, size, and material cost associated with the higher pole count device.

Now that the general approach to designing a high frequency/high pole count device in accordance with the invention has been described, of specific examples will be described to more clearly point out the advantages of this approach. In a first example, a permanent magnet motor having the configuration described above with reference to FIGS. 1 and 2 will be described. This configuration places the rotor out near the outer perimeter of the device which provides the largest possible torque arm for a given size device.

In this first example, the motor is designed to have an overall diameter of about 8 inches and an overall width of about 4 inches. Also, 48 pairs of magnet segments are used to form the rotor poles and 48 electromagnetic assemblies are used. Each U-shaped core piece is formed using nanocrystalline material having a tape width of 0.150 inches thereby giving the one-piece, U-shaped magnetic core an overall thickness of about 0.150 inches. For this example, the overall U-shaped magnetic core is approximately 2¼ inches wide and 1¾ inches tall with each leg of the U-shaped core protruding about ¾ of an inch from the base of the U-shaped core and a space of about ¼ inch between the two legs of the U-shaped core. This configuration results in two stator poles that are ¾ of an inch long and that have a stator pole face area about 1 inch wide by 0.150 inches thick. In this example, coils are formed on each leg of the U-shaped core by winding two layers of 18-gauge wire over each leg along the entire ¾ inch length of the legs. This results in a winding thickness of about 1/16 of an inch. Super magnets are used to form the rotor poles with each magnet segment being approximately 3/16 of an inch thick and 1 inch wide with each magnet segment having a magnet span of about ⅓ of an inch along the direction of the rotational path of the rotor. This configuration results in an overall device that has a 3½ inch torque arm and weighs only about 20 pounds.

Because the device described above uses a thin film soft magnetic material to form the stator cores, this device is designed to operate very efficiently at frequencies of up to at least 1500 Hz. Also, since 48 pairs of magnets are used with each circular path having 48 magnet segments that alternate in polarity from north to south, the device will go through 24 cycles for each rotation of the rotor. Therefore, when operating at 1500 cycles per second, the device will be rotating at a rate of 62½ revolutions per second or 3750 RPM. This results in a very high frequency (1500 Hz) to RPM (3750) ratio of 0.4 which is substantially greater than prior art devices. This ratio of frequency to RPM is an easy ratio to determine and is a ratio that may be used to differentiate devices designed in accordance with the invention from prior art devices.

Based on proven magnetic modeling methods and based on tests results from specific components and devices built in accordance with the invention, a motor built to the specifications described above is expected to provide the following performance characteristics. As mentioned above, the motor operates in a frequency range of 0-1500 Hz and rotates at speeds in the range of 0-3750 RPM. Also, the motor only weighs about 20 pounds. The peak torque is expected to be about 70 foot-pounds with a continuous torque of about 50 foot-pounds. The peak horsepower is expected to be about 53 HP at 3750 RPM and the motor is expected to produce a continuous horsepower output of about 35 HP at 3750 RPM. As can be seen by these results, devices designed in accordance with the invention are capable of very high power densities.

Although the devices described above have been described as having 48 magnet pairs and 48 electromagnetic assemblies, this is not a requirement. In fact, the preferred embodiment of the invention for certain applications may utilize much higher pole counts in larger diameter devices. For example, in the case of a motor that is designed in accordance with the invention and that is designed to be used as a hub motor to directly drive the wheel of a vehicle, the overall diameter of the motor may be substantially larger and the number of magnets and electromagnets may be much greater. In order to illustrate this point, a preferred embodiment of a hub motor for driving a vehicle wheel will be briefly described.

In this embodiment, the hub motor will be designed to have an overall diameter of 15 inches, which is a common vehicle wheel size. Based on this wheel size, this embodiment of the direct drive hub motor will be designed to operate at about 1500 RPM since this would provide an appropriate top speed for the vehicle given the wheel size. Also, as described above, the motor will be designed to operate within a frequency range of 0-1500 Hz. Given these parameters, the motor will have a frequency to RPM ratio of 1 to 1. Again, this ratio of frequency to rotational speed is much higher than conventional motors. Also, since the ratio of frequency to RPM is 1to 1 for this device, the device will need to go through 60 cycles per revolution and will require a pole count of 120 rotor poles, and in this case 120 electromagnetic assemblies since this device is being described as a single phase device for purposes of simplicity. Using the same basic design as described above for the 8-inch motor and device 100 of FIG. 1, the 120 magnet pairs would be distributed around the outer perimeter of the motor and the 120 electromagnetic assemblies would be positioned in an outwardly facing orientation facing the rotor magnets. This configuration would provide a torque arm of about 7 inches, or twice that described for the 8-inch motor. Also, since the thickness of each electromagnetic assembly is less than ⅓ of an inch and the circumference of the device at the air gap between the rotor and the stator is about 44 inches, there is room for 120 electromagnetic assemblies that are the exact same size and configuration as described above for the 8-inch motor.

By scaling up the design as described above, the larger 15-inch device would provide the following performance characteristics. As mentioned above, the motor operates in a frequency range of 0-1500 Hz and rotates at speeds in the range of 0-1500 RPM. Also, the motor would weigh about 50 pounds. The torque would be about five times that of the 8-inch motor, which would give a peak torque of 350 foot-pounds with a continuous torque of about 250 foot-pounds. This is because the torque arm is doubled from 3½ inches to 7 inches and because the number of electromagnets goes from 48 to 120. Therefore the torque is increased by a factor of 2 times 120/48, which equals 5. The peak horsepower would be about 100 HP at 1500 RPM and the motor would produce a continuous horsepower of about 71 HP at 1500 RPM.

When comparing devices designed in accordance with the present invention, the ratio of frequency to RPM provides an easy distinguishing characteristic. For example, the vast majority of currently available motors are designed to operate at 50 to 60 Hz. The main reason for this is that these are the frequencies available on AC electrical power grids. However, another reason for this, and one of the reasons AC power is provided at this frequency, is that these frequencies are well within the frequency capabilities of a conventional iron core motor. These motors are also most often designed to operate at rotational speeds of around 1800 RPM. This gives these types of motors a frequency to RPM ratio of 60 to 1800 or 0.03.

Even in the case of specialty iron core motors, the frequencies typically remain below 400 Hz. This is because the iron core material simply cannot respond to the changing fields this quickly without causing very large losses that show up in the form of heat. Therefore, in order to keep the frequencies of conventional motors and generators low, these devices have historically been designed with relatively low pole counts. As new materials were developed that could operate at higher frequencies, such as amorphous metals, the tendency was to use the new materials in conventional motor designs. This allowed these devices that used the new high frequency materials to operate at much higher RPM. However, the present invention provides a new approach to designing devices using high frequency materials. Instead of using the high frequency material to allow higher speed devices, the present invention combines the high frequency capabilities with dramatically higher pole counts to provide devices that have a frequency to rotational speed ratio that is higher than prior art devices. For example, devices designed in accordance with the present invention will have a frequency to rotational speed ratio greater than 1 to 4 when frequency is measured in cycles per second and rotational speed is measured in RPM. This high frequency to rotational speed ratio of greater than 0.25 provides high stall torque devices that are capable of very high power densities yet still operate at very manageable rotational speeds.

Although the above described embodiments have been described with the various components having particular respective orientations, it should be understood that the present invention may take on a wide variety of specific configurations with the various components being located in a wide variety of positions and mutual orientations and still remain within the scope of the present invention. For example, although each stator arrangement was described as including a certain number of stator poles and the rotor was described as including a certain number of rotor poles, this is not a requirement. Instead, the stator arrangement may have any desired number of stator poles and the rotor any number of rotor poles and still remain within the scope of the invention.

Also, although the above described embodiments have been illustrated and described with the electromagnetic assemblies being radially and uniformly spaced facing the magnet segments of the rotor along the entire circumference of the rotor, this is not a requirement of the invention. In fact, in certain situations, and in accordance with another embodiment of the invention, the electromagnetic assemblies may be positioned along only a portion of the circumference of the rotor.

Figure 7A:
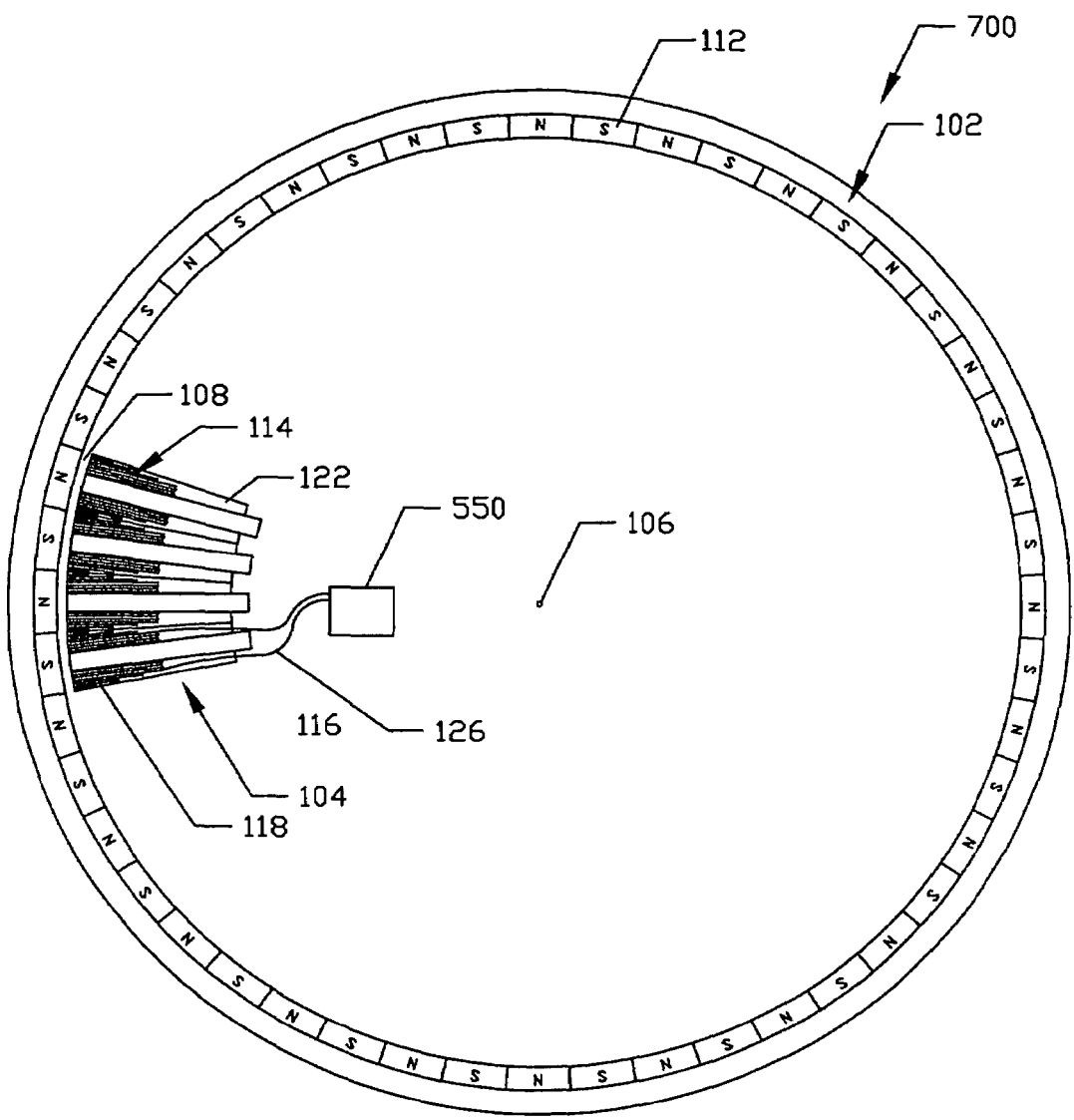
FIG. 7A is a diagrammatic cross-sectional plan view of another embodiment of a device designed in accordance with the present invention including a rotor arrangement and a stator arrangement having a plurality of electromagnetic assemblies with the electromagnetic assemblies being positioned around only a portion of the rotor arrangement

As illustrated in FIG. 7A, electromagnetic assemblies 114 may be positioned facing rotor arrangement 102 along only a portion of the circumference of rotor arrangement 102. In certain applications, especially applications in which the magnet segments may be distributed around a large circumference and/or in low power requirement applications, this configuration may be very advantageous.

Figure 7B:
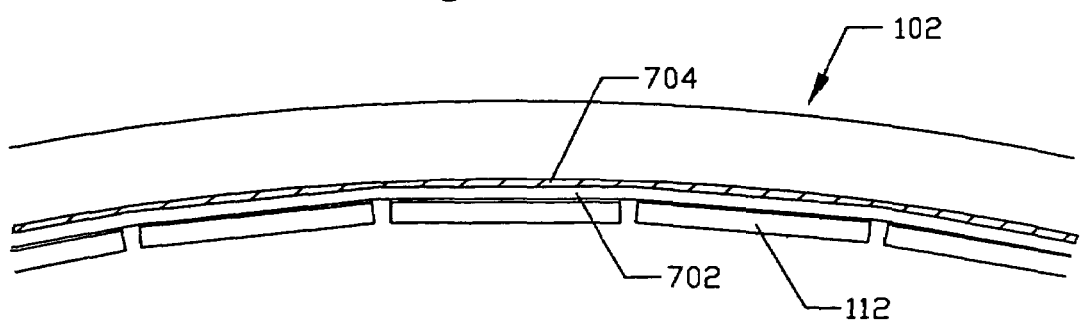
FIG. 7B is an enlarged view of a portion of the device of FIG. 7A.

As a first specific example, in the case of a motorized bicycle, magnet segments 112 may be positioned evenly spaced around the entire inner circumference of the bicycle wheel rim. As illustrated in FIG. 7B, magnet segments 112 may be thin slices of magnet material that are attached to a relatively flexible tape material 702 that supports magnet segments 112 and that is then fixed to the inner circumference of the rim of the bicycle. Tape material 702 may be any magnetic material, for example iron, that is flexible and that is capable of providing the function of a back iron for magnet segments 112. Since most magnet materials are fairly rigid materials, magnet segments 112 may be provided as thin, rectangular slices of magnet material that have flat surfaces on all sides, thereby making the production of magnet segments 112 relatively easy. These magnet segments may then be attached to tape material 702 with a small space between each magnet segment as illustrated in FIG. 7B. Tape 702 may then be attached to rotor 102, in this case the inner circumference of the bicycle rim, such that magnet segments 112 are evenly spaced around the inner circumference of the rim with magnet segments 112 alternating north and south polarity. In this configuration, an adhesive 704 such as epoxy is used to attach tape 702 to rotor 102. Because magnet segments 112 are fairly rigid, and because tape 702 is relatively flexible, tape 702 will tend to flex mainly at points where there are spaces between magnet segments 112 as tape 702 conforms to the circular shape of rotor 102 as illustrated in FIG. 7B. Adhesive 704 may be used to fill any spaces between tape 702 and rotor 102 thereby properly supporting magnet segments 112. Adhesive 704, or any other suitable material, may also be used to fully encapsulate magnetic segments 112 to protect the magnet segments from oxidation.

The configuration described immediately above could provide a very large number of rotor poles for a light weight bicycle motor/generator. For a typical bicycle, the wheel rim may have a diameter of approximately 26 inches. Therefore, if each magnet segment is ½ of an inch in length, there would be approximately 164 magnet segments, or rotor poles, distributed around the inner circumference of the wheel rim. A small number of electromagnetic assemblies 114 may then be supported by a portion of the bicycle frame to be held adjacent to a portion of the wheel rim facing magnet segments 112.

In accordance with the invention, the above described bicycle wheel device provides a high frequency electric motor/generator that delivers high power at a very low weight. This is due to the very large torque arm of approximately 13 inches that this configuration provides and due to the high frequency of the device. The weight is kept very low (as low as a few pounds) because only a few electromagnetic assemblies 114 are used and because the magnet segments 112 may be provided as thin slices of magnetic material. The frequency is high due to the fact that a high number of rotor poles are being used. In the above example, the frequency of the device would be 82 cycles per revolution of the wheel. Therefore, the frequency (cycles per second) to rotational speed (RPM) ratio described above would be about 4 to 3, that is, substantially greater than 1 to 4.

Figure 8:
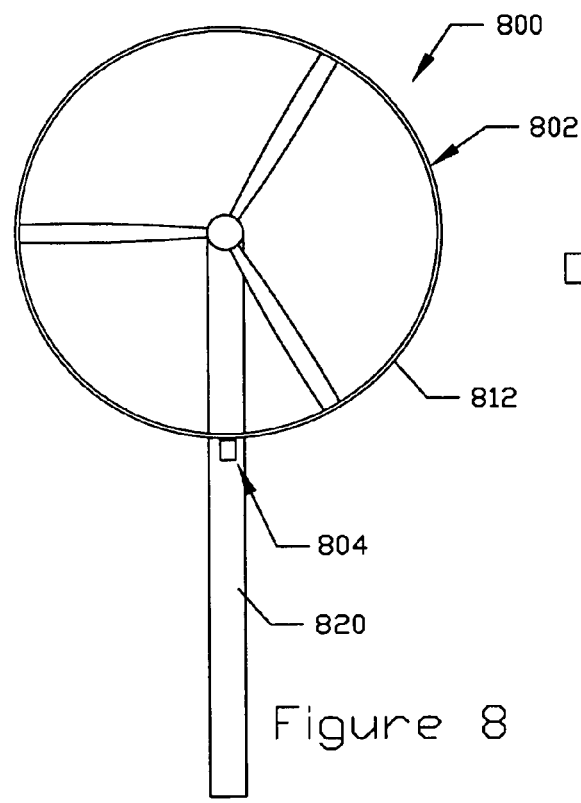
FIG. 8 is a diagrammatic front view of a windmill designed in accordance with the present invention.

FIG. 8 illustrates a windmill generator 800 designed in accordance with the invention. This is another specific example of a device that takes advantage of using a large diameter rotor and only a relatively small number of electromagnetic assemblies facing only a portion of the rotor arrangement. In this example, a very large diameter ring is placed around the outer circumference of the windmill blades as illustrated in FIG. 8. This ring may be used to provide additional structural support for the windmill blades and also provide the structural support for a rotor arrangement 802 similar to the rotor arrangement described above for the bicycle wheel embodiment. However, in this case, rotor arrangement 802 includes magnet segments 812 that are attached to the outer side of rotor arrangement 802. A stator arrangement 804 is mounted to a support post 820 of windmill 800 such that the stator poles of the magnetic assemblies are facing magnet segments 812. With this configuration, a very large number of magnet segments 812 may be positioned around the outer circumference of rotor arrangement 802. This very large number of magnet segments causes the generator of this configuration to be high frequency even though the windmill may operate at a relatively slow RPM. As was described above for the bicycle wheel embodiment, this embodiment greatly reduces the weight of the generator for this system compared with conventional windmill generators. Also, this configuration can be configured to completely eliminate the need for reduction gears which can significantly improve the efficiency of the overall system compared to conventional windmill generators that require very substantial reduction gears between the windmill and the generator.

Figure 9:
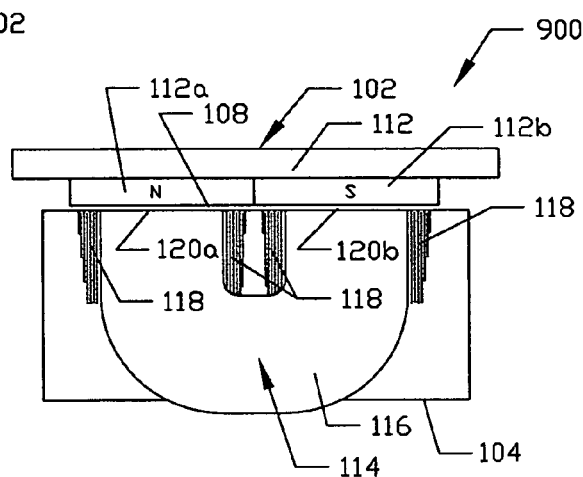
FIG. 9 is a diagrammatic cross-sectional view of another embodiment of a device designed in accordance with the present invention in the form of a linear device.
Figure 10:
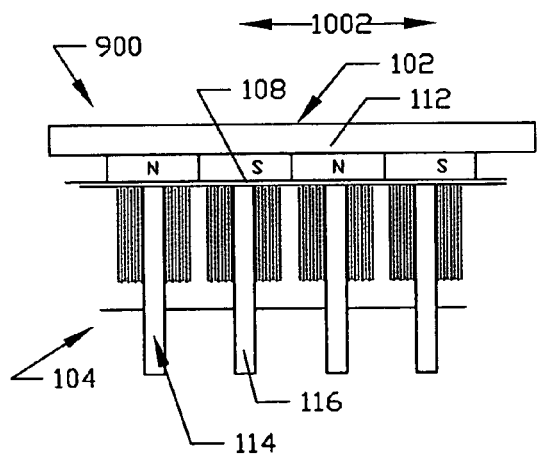
FIG. 10 is a diagrammatic side view of the embodiment of FIG. 9.

Although all of the embodiments described above have been describe as rotational devices, this is not a requirement of the invention. Instead, it should be understood that a device designed in accordance with the present invention may also be provided as a linear device or a reciprocating device 900 as illustrated in FIGS. 9 and 10. In the case of a linear device, magnet segments 112 (or in the alternative electromagnetic assemblies) would be supported along the length of a desired path to form the equivalent of a rotor arrangement 102. Electromagnetic assemblies 114 would be supported on the equivalent of a stator arrangement 104 or car designed to travel along the length of the path formed by the magnet segments. Alternatively, in the case of a reciprocating device, a similar configuration may be controlled in such a way as to drive either the equivalent of rotor arrangement 102 or the equivalent of stator arrangement 104 back and forth as illustrated by arrow 1002 in FIG. 10. This may be accomplished with the assistance of a spring arrangement or other mechanism for controlling the extent of the motion of the equivalent of the rotor arrangement 102 relative to the equivalent of the stator arrangement 104 as is known in the art.

Figure 11:
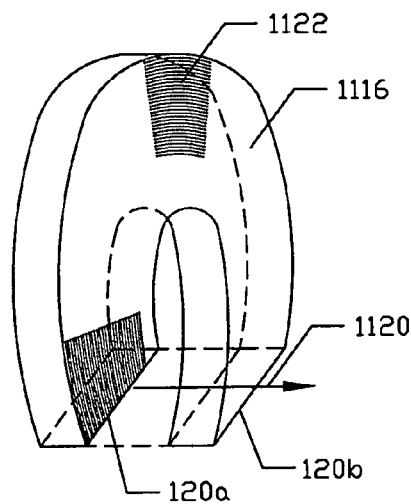
FIG. 11 is a diagrammatic perspective view of an alternative configuration for a magnetic core formed from thin film soft magnetic material in accordance with the invention.

Although device 100 of FIG. 1 was described as having U-shaped magnetic cores 116 that are positioned with their magnetic poles located adjacent to one another along a line that is parallel to the rotational axis of the device, this is not a requirement. Instead, it should be understood that the present invention would equally apply to other configurations. For example, the U-shaped magnetic cores may be formed as a U that has the two legs of the U twisted relative to one another such that the legs of the U overlap one another. As illustrated in FIG. 11, this configuration provides a magnetic core 1116 with magnetic poles 120a and 120b being located adjacent to one another along a line that follows the rotational path of the device as indicated by arrow 1120. Also, as was described above for FIG. 5 and magnetic cores 116, this configuration eliminates parasitic gaps within the one-piece magnetic cores. This configuration also orients the layers of thin film soft magnetic material in the proper orientation for directing the flux through the magnetic core as illustrated by lines 1122 in FIG. 11.

Figure 12:
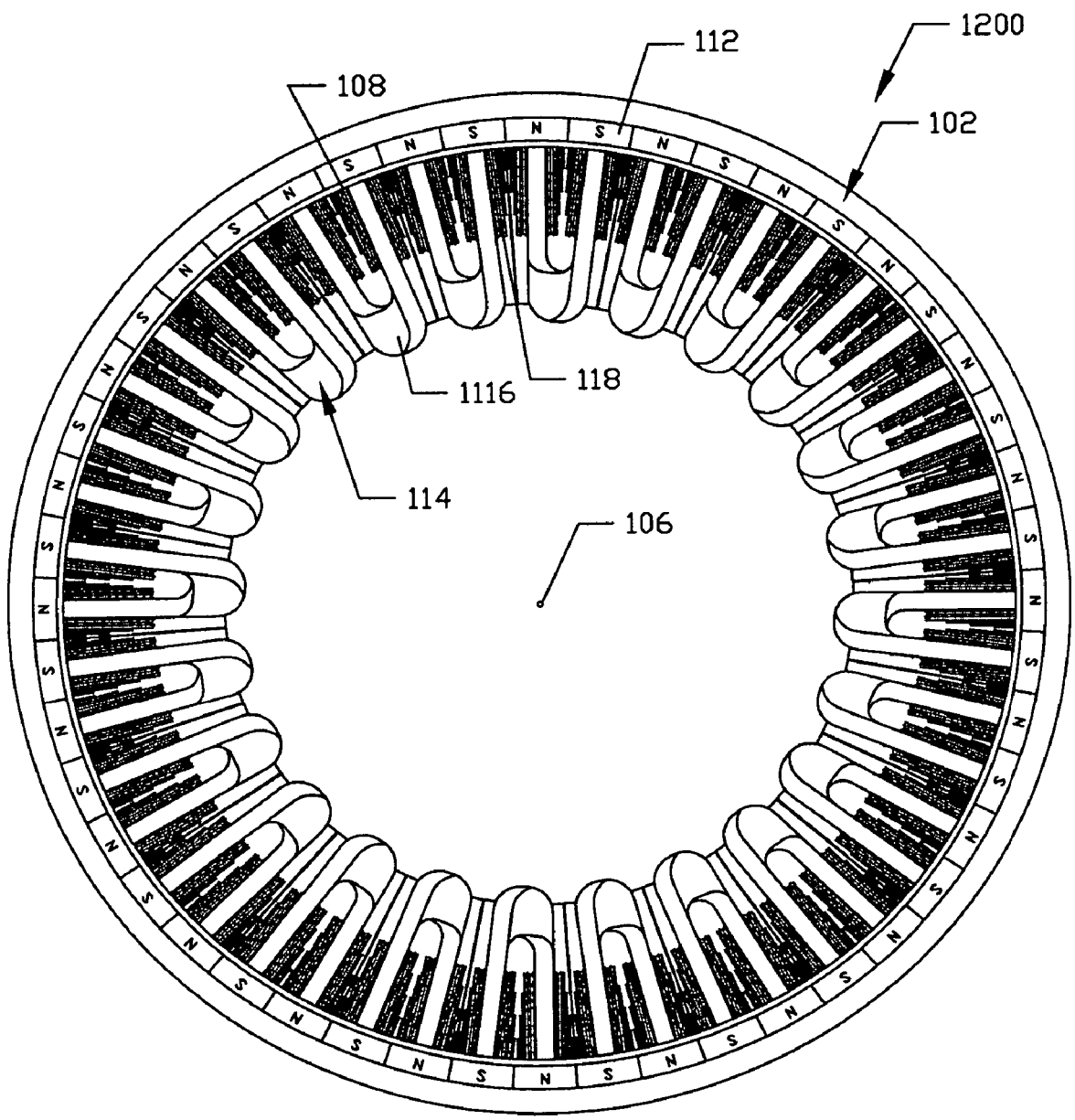
FIG. 12 is a diagrammatic cross-sectional plan view of another embodiment of a device designed in accordance with the present invention including a rotor arrangement and a stator arrangement having a plurality of electromagnetic assemblies.

As illustrated by device 1200 in FIG. 12, magnetic cores 1116 may be positioned such that the magnetic poles of each assembly are aligned with one another along the rotational path of device 1200. This configuration reduces the number of electromagnetic assemblies by one half compared to device 100 of FIG. 1, and would result in a single circular path of magnet segments 112 rather than the two adjacent circular paths described above for device 100. Although this would reduce the weight and cost of device 1200, it would provide only half the torque and power compared to device 100. However, for certain applications, this type of configuration may be preferable.

The present invention would equally apply to a wide variety of other configurations of electric motors and generators so long as the stator arrangement of the device includes at least one electromagnetic assembly with each assembly having a one-piece core formed from thin film soft magnetic material that provides the entire return path for the stator poles of that assembly. Alternatively, the present invention would equally apply to a wide variety of electric motors and generators so long as the device includes a stator arrangement having a magnetic core formed from a thin film soft magnetic core material and operates with a frequency to rotational speed ratio of greater than 1 to 4. Or alternatively, the present invention would equally apply to a wide variety of rotational electric motors and generators so long as the rotational device includes a rotor arrangement supported for rotation relative to a stator arrangement along a circular path with the stator arrangement having electromagnetic assemblies that are positioned along only a portion of the circular path facing the rotor arrangement. All of the above described devices may take the form of, but are not limited to, motors and generators of the DC brushless type, DC synchronous type, variable reluctance or switched reluctance type, induction type, and many other types of generators, motors, and alternators. These various devices also include single-phase devices and multi-phase devices. Therefore, the present examples are to be considered as illustrative and not restrictive, and the invention is not to be limited to the details given herein, but may be modified within the scope of the appended claims.

What is claimed is:

1. A device selected from the group of devices consisting of an electric motor, an electric generator, and a regenerative electric motor, the device comprising:

a stator arrangement, the stator arrangement including at least one independent energizable electromagnetic assembly with each independent electromagnetic assembly having an associated one-piece magnetic core formed from thin film soft magnetic material, each independent electromagnetic assembly defining two stator poles located at opposite ends of the one-piece magnetic core, each one-piece magnetic core providing the entire magnetic return path for the two opposite magnetic stator poles associated with each independent electromagnetic assembly.

2. A device according to claim 1 wherein:

the device is a rotating device;

the device includes a rotor arrangement supported for rotation relative to the stator arrangement about a given rotational axis at a certain range of normal operating rotational speeds, the rotor arrangement including a plurality of rotor poles for magnetically interacting with the stator poles, the rotor poles being supported for rotation about the rotational axis relative to the stator arrangement along a circular path;

the device is a radial gap device; and the electromagnetic assemblies of the stator arrangement include U-shaped one-piece magnetic cores formed such that the stator poles of each electromagnetic assembly are located at the ends of the legs of the U-shaped magnetic cores, the electromagnetic assemblies being positioned around the circular path of the rotor poles, each electromagnetic assembly being positioned such that the two stator poles of each electromagnetic assembly are located adjacent to one another facing the circular path of the rotor poles and in line with one another along the direction of the circular path of the rotor poles.

3. A device according to claim 1 wherein:

the device is a rotating device;

the device includes a rotor arrangement supported for rotation relative to the stator arrangement about a given rotational axis at a certain range of normal operating rotational speeds, the rotor arrangement including a plurality of rotor poles for magnetically interacting with the stator poles, the rotor poles being supported for rotation about the rotational axis relative to the stator arrangement along a circular path; and the electromagnetic assemblies of the stator arrangement being positioned around only a portion of the circular path of the rotor poles.

4. A device according to claim 1 wherein the device is a linear device.

5. A device according to claim 4 wherein the device is a reciprocating device.

6. A device according to claim 1 wherein the thin film soft magnetic material is a nano-crystalline material.

7. A device according to claim 1 wherein each of the independent electromagnetic assemblies is independently removable and replaceable.

8. A device according to claim 1 wherein the device is a device selected from the group of devices consisting of a switched reluctance device, an induction device, or a permanent magnet device.

9. A device according to claim 1 wherein the device further includes:

a plurality of associated magnetic poles configured to magnetically interact with the stator poles of the electromagnetic assemblies; and a switching arrangement for controlling the electromagnetic assemblies, the switching arrangement being configured such that the switching arrangement is able to cause the stator poles of the electromagnetic assemblies to magnetically interact with the associated magnetic poles at a frequency of at least 500 cycles per second while the device is operated within at least a portion of the normal operating speed range of the device.

10. A device according to claim 9 wherein:

the device is a rotational device including a rotor arrangement supported for rotation relative to the stator arrangement about a given rotational axis at a certain range of normal operating rotational speeds, the rotor arrangement including a plurality of rotor poles for magnetically interacting with the stator poles, the rotor poles being supported for rotation about the rotational axis relative to the stator arrangement along a circular path; and the switching arrangement causes the stator poles of the electromagnetic assemblies to magnetically interact with the rotor poles of the rotor arrangement such that the ratio of the frequency of the device in cycles per second relative to the revolutions per minute of the device is greater than 1 to 4 during the operation of the device.

11. A device according to claim 10 wherein the rotor arrangement includes at least 36 pairs of adjacent rotor poles.

12. A device according to claim 9 wherein the stator arrangement includes at least 48 electromagnetic assemblies.

13. A device according to claim 9 wherein the stator poles face inward toward the rotational axis of the device.

14. A device according to claim 9 wherein the stator poles face outward away from the rotational axis of the device.

15. A device according to claim 1 wherein the device is a multiple phase device.

16. A device selected from the group of devices consisting of an electric motor, an electric generator, and a regenerative electric motor, the device comprising:

a stator arrangement, the stator arrangement including a plurality of independent energizable electromagnetic assemblies with each independent electromagnetic assembly having an associated one-piece magnetic core, each independent electromagnetic assembly defining two stator poles, each one-piece magnetic core providing the entire magnetic return path for the two magnetic stator poles associated with each independent electromagnetic assembly; and a rotor arrangement supported for rotation relative to the stator arrangement about a given rotational axis at a certain range of normal operating rotational speeds, the rotor arrangement including a plurality of rotor poles for magnetically interacting with the stator poles, the rotor poles being supported for rotation about the rotational axis relative to the stator arrangement along a circular path, the electromagnetic assemblies of the stator arrangement being positioned around only a portion of the circular path of the rotor poles.

17. A device according to claim 16 wherein the one-piece magnetic cores are formed from thin film soft magnetic material.

* * * * *